(12) United States Patent
Shi et al.

(10) Patent No.: US 6,480,367 B2
(45) Date of Patent: Nov. 12, 2002

(54) DUAL-SWITCHING AND DUAL-LINEAR POWER CONTROLLER CHIP

(75) Inventors: Bingxue Shi, Beijing (CN); Lu Chen, Beijing (CN); Chun Lu, Beijing (CN)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/756,443

(22) Filed: Jan. 9, 2001

(65) Prior Publication Data

US 2002/0089315 A1 Jul. 11, 2002

(51) Int. Cl.$^7$ ................................................ H02H 7/00
(52) U.S. Cl. ........................ 361/18; 700/300; 361/93.2; 361/91.9
(58) Field of Search .......................... 361/86, 18, 93.2, 361/91.9; 307/87; 323/267, 268, 276; 365/226; 700/300, 320

(56) References Cited

U.S. PATENT DOCUMENTS

| | | | | | |
|---|---|---|---|---|---|
| 5,627,460 | A | * | 5/1997 | Bazinet et al. | 323/224 |
| 5,652,479 | A | * | 7/1997 | LoCascio et al. | 315/209 R |
| 5,691,870 | A | * | 11/1997 | Gebara | 307/87 |
| 5,773,966 | A | * | 6/1998 | Steigerwald | 323/284 |
| 6,218,817 | B1 | * | 4/2001 | Chang | 323/267 |

* cited by examiner

*Primary Examiner*—Shawn Riley
(74) *Attorney, Agent, or Firm*—J.C. Patents

(57) ABSTRACT

A hybrid 4-in-1 power controller chip for a PC mainboard which integrates a synchronous buck switching regulator to supply the CPU core voltage, a standard buck switching regulator for I/O circuits, a linear controller for the GTL bus, and a linear regulator with built-in pass transistor for a clock generator. Therefore, a hybrid power system for a PC mainboard is constructed.

8 Claims, 4 Drawing Sheets

DUAL-SWITCHING AND DUAL-LINEAR POWER CONTROLLER CHIP

BACKGROUND OF THE INVENTION

1. Field of Invention

The present invention relates to a power controller and, more particularly, to a hybrid 4-in-1 power controller chip for a PC mainboard integrating a synchronous buck switching regulator, a standard buck switching regulator, a linear controller and a linear regulator.

2. Description of Related Art

Power supplies are usually divided into two basic types; linear regulator and switching regulator. Linear regulators have the merits of small ripple, fast dynamic response and little interference. However, the low conversion efficiency of linear regulators is not suitable for high-power applications such as a high-performance central processing unit (CPU) whose power consumption exceeds 30 watts. To efficiently convert 5 volts from the power supply of a computer to 1.3–3.5 volts as the power supply for a CPU, a buck switching regulator is adopted because of its greatly improved DC-DC conversion efficiency. However, the ripple, dynamic response, and noise of the switching regulator cannot compare with the linear regulator.

The whole switching regulator system can be integrated into a small space via a high-density package. This type of module can greatly decrease the system area and weight, but the cost is high. It has been suggested that switching frequency and output voltage can be adjusted according to the specific tasks which the CPU is processing, but its large output ripple cannot meet the VRM8.4 design guidelines established by Intel for the power supplies of the newest Pentium III CPUs. In addition to the switching regulator for the CPU, there are other switching and linear regulators on the PC mainboard for other circuits.

With the development of the VLSI process, it is now possible to integrate all of the controllers of the switching and linear regulators into one chip, which can meet the demand of increased integration and reduced costs.

SUMMARY OF THE INVENTION

To achieve the above-mentioned objects and advantages, the present invention provides a new hybrid 4-in-1 power controller chip for a PC mainboard which integrates a synchronous buck switching regulator to supply the CPU core voltage, a standard buck switching regulator for I/O circuits, a linear controller for the GTL bus, and a linear regulator with built-in pass transistor for a clock generator.

On this basis, a hybrid power system for a PC mainboard is constructed. As compared with the conventional separate power systems on a PC mainboard, the hybrid power system of the present invention can save board area and reduce cost. Test results show this system has high precision and its synchronous switching regulator meets the specifications of Intel's VRM8.4 design guidelines for Pentium III CPUs.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
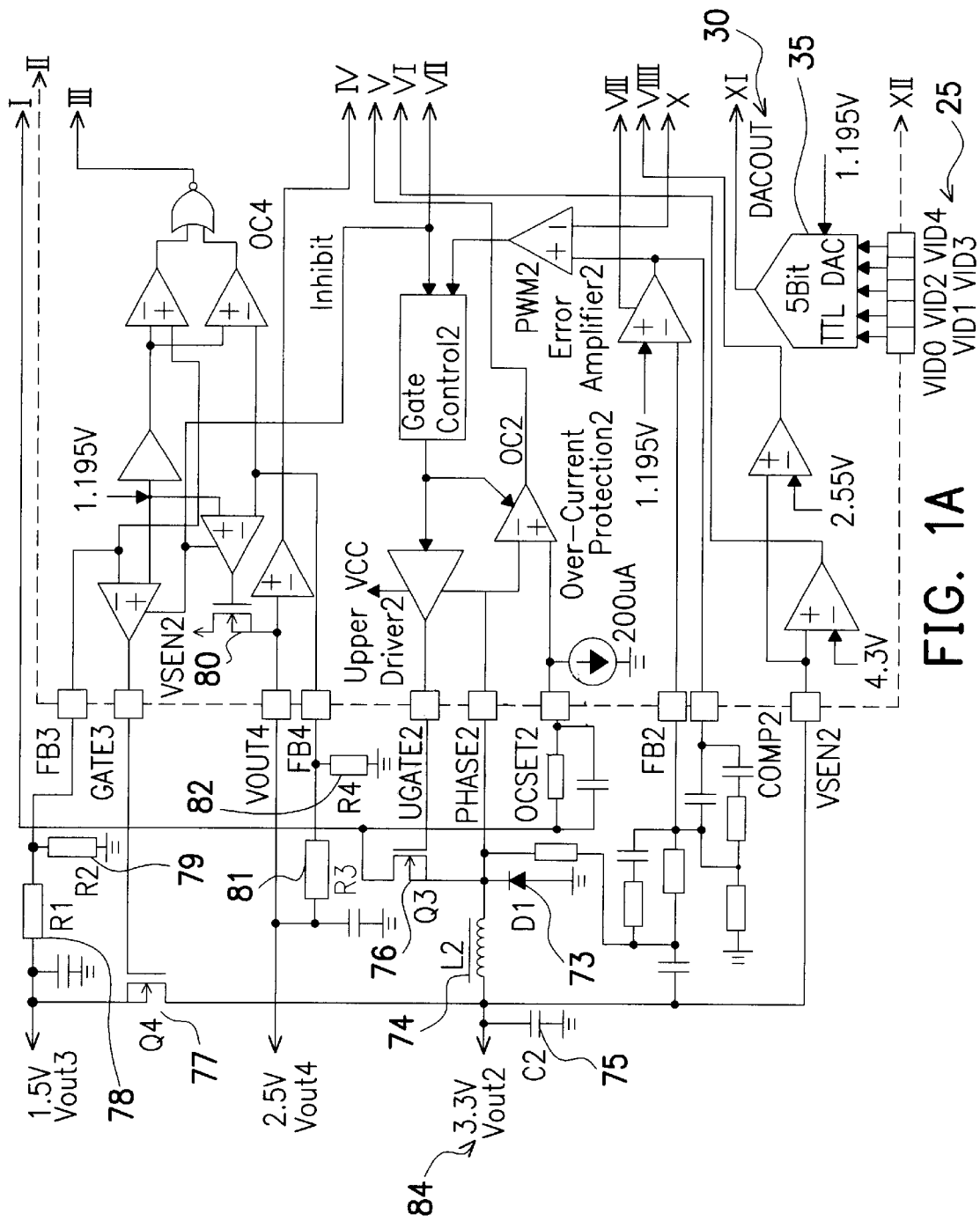
FIG. 1A and FIG. 1B are schematic circuit diagrams of a 4-in-1 hybrid power controller of an embodiment of the present invention and associated peripheral circuits.

Reference will now be made in detail to the preferred embodiments of the present invention, examples of which are illustrated in the accompanying drawings. Wherever possible, the same reference numbers are used in the drawings and the description to refer to the same or like parts.

Figure 1B:
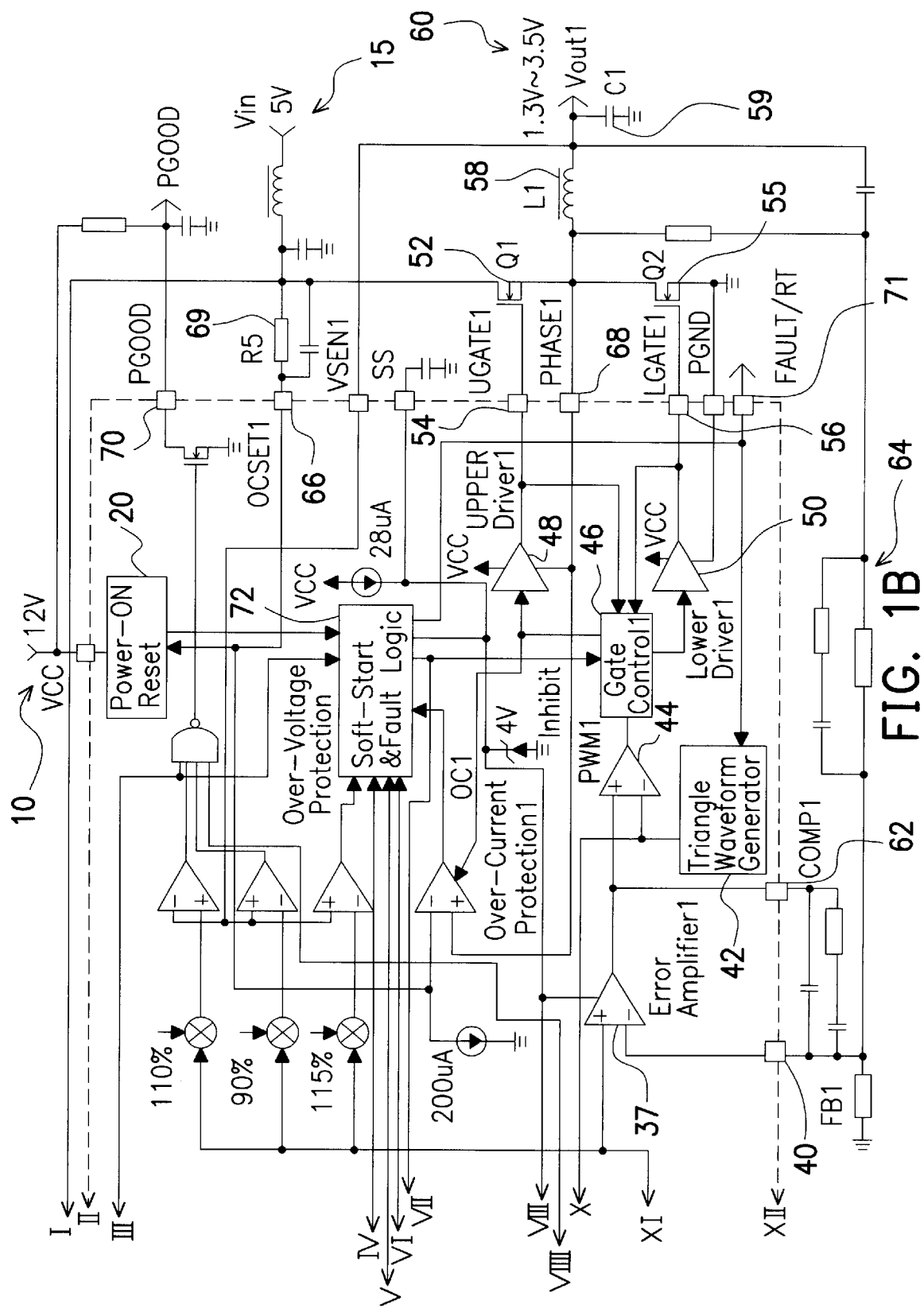

Referring to FIG. 1A and FIG. 1B, which are schematic circuit diagrams of a 4-in-1 hybrid power controller of an embodiment of the present invention and associated peripheral circuits. Note that the circuitry inside the dashed line is the chip while the circuitry outside the dashed line is its peripheral circuit.

Particularly referring to the section of FIG. 1A and FIG. 1B concerning the synchronous buck switching regulator.

When input voltages $V_{CC}$ 10 and $V_{IN}$ 15 go above a threshold, the power-on reset circuit 20 outputs a startup signal which makes the chip begin to work. For example, $V_{CC}$ is 12 volts and $V_{IN}$ is 5 volts.

The band gap reference voltage 1.195 volts and the voltage identification pins $V_{ID0}$–$V_{ID4}$ 25 control the 5-bit TTL digital-to-analog converter 30, so 32 discrete voltages from 1.3V to 3.5V can be programmed at $V_{DACOUT}$ 35. The first error amplifier 37 amplifies the difference between $V_{DACOUT}$ 35 and the feedback of the actual output voltage at FBI 40. The result is then compared with a triangle waveform generated by a triangle waveform generator 42.

After the comparison, a pulse-width modulation (PWM) signal PWM1 44 will be generated. The first gate control logic circuit 46 is used to prevent this PWM1 44 signal from transferring to upper output driver 48 and lower output driver 50 in the case of an over-current or over-voltage condition. Under this type of condition, it will turn off the two power MOSFETs Q1 52 and Q2 55, so there is no output voltage and the CPU will be protected.

In the normal condition, this PWM1 signal 44 passes to the upper output driver 48 and lower output driver 50, and two non-overlapping synchronous driving signals UGATE1 54 and LGATE1 56 are generated, which control Q1 52 and Q2 55 respectively. Thus, with the inductor L1 58 and output capacitor C1 59, a complete synchronous rectified buck switching regulator is constructed.

The output voltage Vout1 60 is fed back to FBI 40 through a feedback compensation network COMP1 62, this negative feedback can guarantee that Vout1 60 is stable. There is also a negative feedback network 64 between FBI 40 and COMP1 62, which is used to compensate the error amplifier 37. This controller has perfect over-current, over-voltage protection and soft-start function.

Because Q1's 52 Vds(on) is proportional to the output current, over-current can be detected by the comparison of OCSET1 66 and PHASE1 68. R5 69 is used to adjust the over-current threshold so under this condition a current sensing resistor is not necessary.

The PGOOD signal 70 shows whether the output voltage is within +/−10% of the DAC 30 setting. When the output voltage exceeds 115% of the DAC 30 setting, the over-voltage protection circuit not only turns off Q2 55 to decrease the output voltage, but also outputs a signal at the FAULT/RT pin 71 to control other peripheral protection circuits.

The FAULT/RT pin 71 can also be connected with a resistor to adjust the frequency of the triangle waveform, so that the output ripple and the MOSFET switching power dissipation can be compromised according to various applications. To make sure that the output voltage has no big overshoot during the startup process, a soft-start circuit 72 is used to control the rising of the output voltage. This synchronous switching regulator can meet the requirement of high conversion efficiency of high-power CPUs.

Referring to FIG. 1A and FIG. 1B, which are schematic circuit diagrams of a 4-in-1 hybrid power controller of an embodiment of the present invention and associated peripheral circuits. Particularly referring to the section of FIG. 1A and FIG. 1B concerning the standard buck switching regulator.

For the I/O circuit, which has a smaller load current than that of the CPU on the PC mainboard, a standard buck switching regulator is provided which replaces the lower power MOSFET of the synchronous switching regulator with a Schottky diode D1 73, so the lower output driver is unnecessary. Besides, because its output voltage Vout2 84 is fixed and is not programmable, it has no DAC circuit and its over-voltage detection circuit doesn't include the 115% multiplier. Adding the peripheral D1 73, L2 74, C2 75, Q3 76 and other feedback networks with the on-chip controller, a standard buck switching regulator is set up.

Referring to FIG. 1A and FIG. 1B, which are schematic circuit diagrams of a 4-in-1 hybrid power controller of an embodiment of the present invention and associated peripheral circuits. Particularly referring to the section of FIG. 1A and FIG. 1B concerning the linear controller.

Except for the over current detection circuit, the linear controller mainly comprises an error amplifier. Adding the peripheral power MOSFET Q4 77 and resistance feedback network (RI 78 and R2 79), a complete linear power supply is set up for the GTL bus on the PC mainboard.

Referring to FIG. 1A and FIG. 1B, which are schematic circuit diagrams of a 4-in-1 hybrid power controller of an embodiment of the present invention and associated peripheral circuits. Particularly referring to the section of FIG. 1A and FIG. 1B concerning the linear regulator.

Because the maximum load current of the clock generator on the PC mainboard is below 0.4 amps, a linear regulator with built-in pass transistor 80 is designed. It uses an on-chip CMOS transistor 80 with big W/L dimension as the pass device, so the peripheral power MOSFET is unnecessary. Adding the peripheral resistance feedback network (R3 81 and R4 82), a complete linear power supply is set up. To detect the over-current of the built-in transistor 80, a circuit based on current mirror and current comparator is designed.

Figure 2:
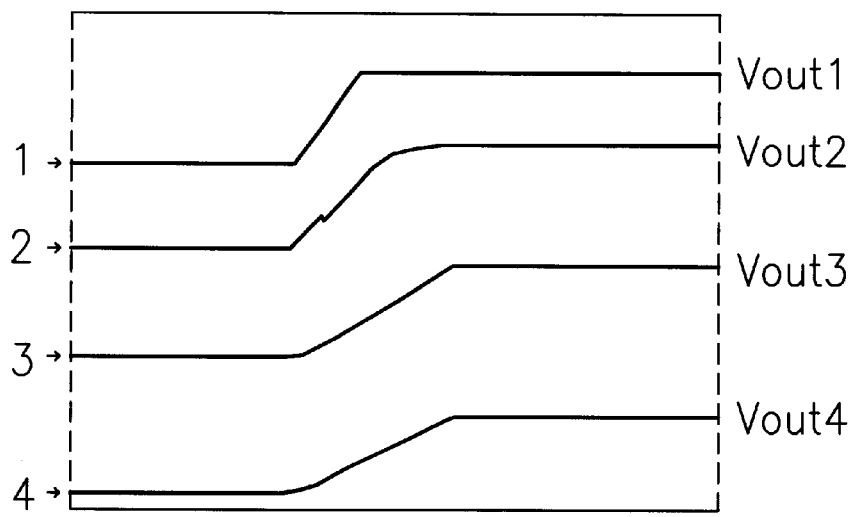
FIG. 2 is a graph illustrating the startup waveforms of the hybrid power system of an embodiment of the present invention.

On the basis of the fabricated chip, a hybrid power system for the PC mainboard was constructed. FIG. 2 shows the startup test result of the hybrid power system. It can be seen that during the startup process the four output voltages are rising almost linearly from 0V to their respective voltages, and there are no big over-shoots.

Static voltage tests shows that the designed hybrid has high precision. The voltage of the synchronous switching regulator has a precision of ±0.8% over the output current range of 0–18 A. The voltage of the standard switching regulator has a precision of 1.7% over the output current range of 0–10 A. The voltages of the two linear regulators have a precision of ±2.2% over the output current range of 0–4 A and 0–0.4 A respectively.

An important difference between a CPU power supply and an ordinary power supply is that the transient response of the CPU power supply must be very fast. For example, when a Pentium III 550MHz CPU is in a dormant state, its current is less than 1.7 A. However, when it works in full load state, its current will jump to 17 A. This rising process must be finished in 100μs, and the output voltage fluctuation should be below 0.08V during the process.

Figure 3:
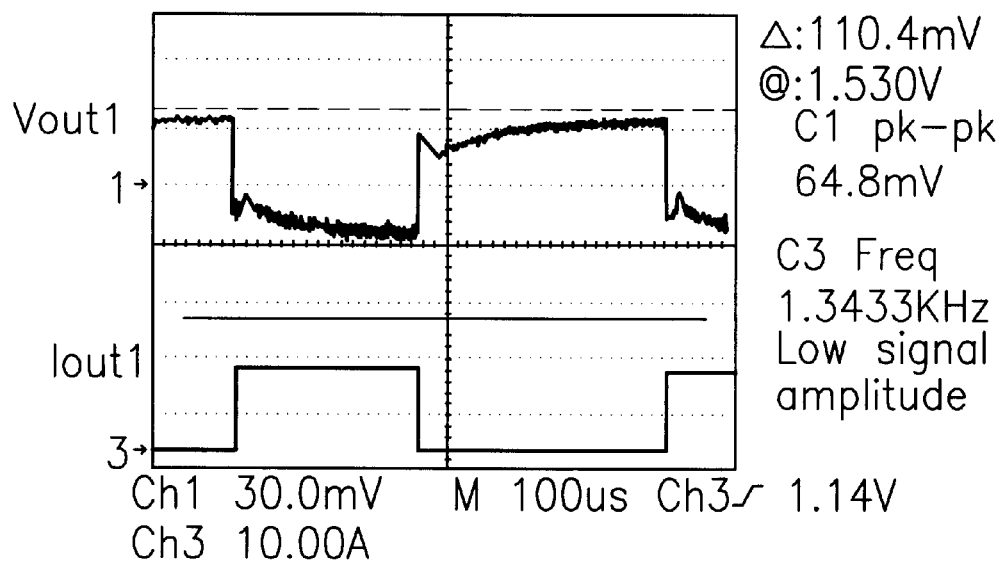
FIG. 3 is a graph illustrating the transient response of a synchronous switching regulator of an embodiment of the present invention.

A transient test was performed on the synchronous switching regulator of the designed hybrid power system according to Intel's VRM8.4 design guidelines which specifies the details of the voltage regulator module for a Pentium III CPU. Refer to FIG. 3, which shows the transient response result of the synchronous switching regulator. It can be seen that when output current Iout1 changes between 0.8 A and 18 A in a frequency of 1.3 KHz, the fluctuation range of output voltage Vout1 is only 64.8 mV. This is lower than the 80 mV prescribed in VRM8.4. Furthermore, the transient process lasts less than 100 μs.

Figure 4:
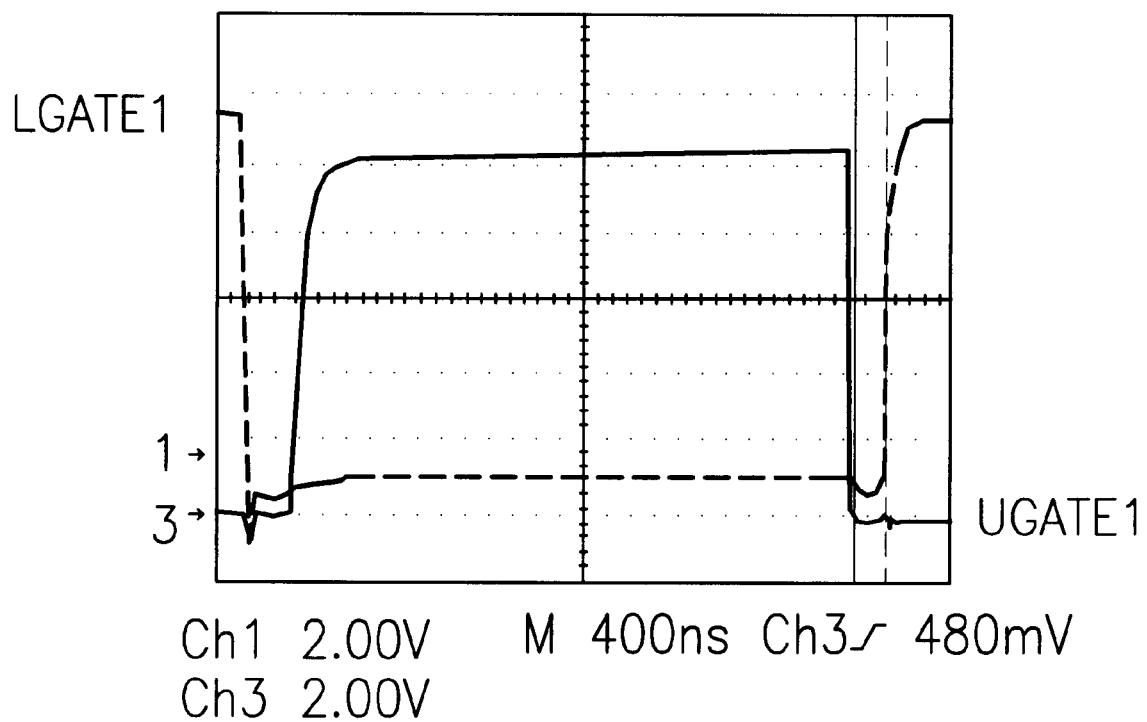
FIG. 4 is a graph illustrating the waveforms of the synchronous driving signals of an embodiment of the present invention.

Referring to FIG. 4, which shows the test result of driving signals UGATE1 and LGATE1 for a synchronous switching regulator. These two non-overlapping signals guarantee that power MOSFETs Q1 and Q2 will not open at the same time. Because the time when Q1 and Q2 are both closed is only 0.1 μs, and during this time current goes through the body diode of Q2, the conversion efficiency will not drop greatly.

As compared with the conventional separate power systems on a PC mainboard, the hybrid power system of the present invention can save board area and reduce cost. Additionally, test results show this system has high precision and its synchronous switching regulator meets the specifications of Intel's VRM8.4 design guidelines for Pentium III CPUs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-switching and dual linear power controller chip, comprising:
   a synchronous buck switching regulator for supplying programmable voltages to a central processing unit;
   a standard buck switching regulator, coupled to the synchronous buck switching regulator, for supplying a first fixed voltage to an input/output circuitry;
   a linear controller, coupled to the synchronous buck switching regulator and the standard buck switching regulator, for supplying a second fixed voltage to a gunning transceiver logic bus; and
   a linear regulator, coupled to the synchronous buck switching regulator, the linear controller, and the standard buck switching regulator, for supplying a third fixed voltage to a clock generator.

2. The dual-switching and dual linear power controller chip of claim 1, wherein the linear regulator further comprises a built-in pass transistor.

3. The dual-switching and dual linear power controller chip of claim 1, wherein the linear regulator further comprises a circuit based on current mirror and current comparator for detecting over-current of the built-in pass transistor.

4. The dual-switching and dual linear power controller chip of claim 1, wherein the synchronous buck switching regulator is programmable to provide a plurality of voltages.

5. The dual-switching and dual linear power controller chip of claim 1, wherein the synchronous buck switching regulator is programmable to provide 32 discrete voltages from 1.3 volts to 3.5 volts.

6. The dual-switching and dual linear power controller chip of claim 1, wherein the linear controller comprises an over-current detection circuit and an error amplifier.

7. The dual-switching and dual linear power controller chip of claim 1, wherein the synchronous buck switching regulator further comprises a gate control logic circuit to prevent an output voltage when an over-current or over-voltage condition oCCurs.

8. The dual-switching and dual linear power controller chip of claim 1, wherein the synchronous buck switching regulator further comprises a n output signal indicating an over-voltage condition.

* * * * *